T. J. MAYALL.
Machines for Cutting Rubber Sheets into Strips.
No. 140,933. Patented July 15, 1873.
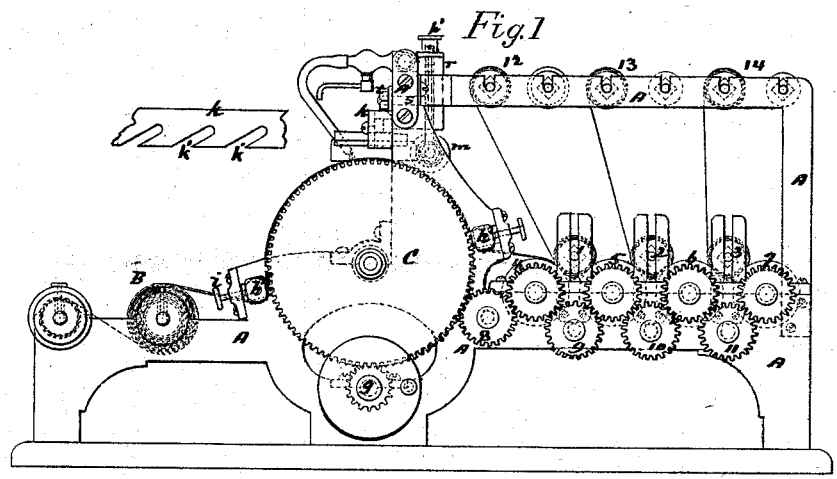
Fig. 1
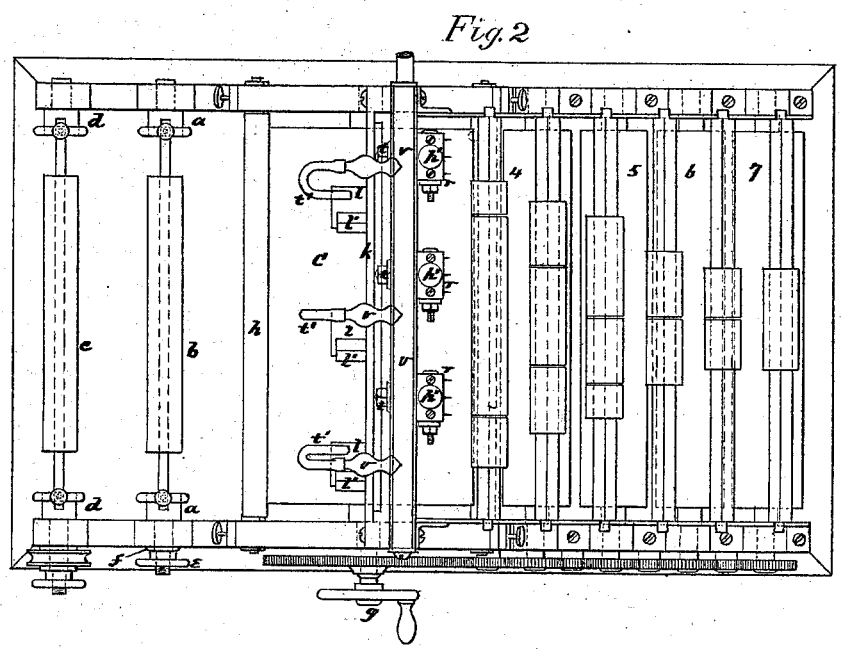
Fig. 2
Witnesses:
John Buckery
W. E. Chaffee
Inventor:
Thos. J. Mayall
by atty Pollok

UNITED STATES PATENT OFFICE.

THOMAS J. MAYALL, OF BOSTON, MASSACHUSETTS.

IMPROVEMENT IN MACHINES FOR CUTTING RUBBER SHEETS INTO STRIPS.

Specification forming part of Letters Patent No. 140,933, dated July 15, 1873; application filed June 28, 1873.

*To all whom it may concern:*

Be it known that I, THOMAS J. MAYALL, of Boston, Suffolk county, Massachusetts, have invented certain new and useful Improvements in Machinery for Cutting India-Rubber Sheets into Strips, of which the following is a specification:

My invention relates to machinery employed to cut up sheets of uncured or green rubber into strips of any width suitable for the uses to which said strips are afterward to be put. It is designed with special reference to cutting pure rubber sheets, or sheets composed of rubber compound only, rather than sheets consisting of canvas or fabric and rubber combined, although it may be used for the latter.

The nature of my invention and the manner in which the same is or may be carried into effect will be understood by reference to the accompanying drawing, in which—

Figure 1 is a side elevation, and Fig. 2 a plan, of a machine constructed in accordance with my invention.

A is the frame, which supports the various working-parts of the machine. The rubber sheet is wound up in roll form with a sheet of cotton or other fabric or material in the usual way on a wooden shaft or stem, which shaft is placed in journaled sockets $a$ at the front of the machine. The roll of rubber is indicated at B, Fig. 1, and the journaled sockets and the shaft without the rubber are seen at $a$ and $b$, respectively, Fig. 2. A similar shaft, $c$, is supported in like sockets or bearings $d$, upon which shaft the cloth or other material wound up with the rubber sheet to prevent the folds of the latter from sticking together is designed to be wound in proportion as it is delivered from the rubber roll-shaft during the operation of the machine. The rubber roll-shaft has a suitable tension applied to it, as, for instance, the tightening-nut and friction-washer, shown at $e f$, on the stem of one of the journaled sockets in Fig. 2. To the left of the roll-shaft is arranged a large rotating carrier-drum, C, which serves as a table, on which the rubber is cut. It is revolved by means of a pinion on the main or driving-shaft $g$, engaging teeth formed on the periphery of the drum, or a toothed wheel attached to the drum. In front of the drum is placed a horizontal presser bar or roll, $h$, supported at the ends in boxes $h^1$, capable of sliding in elongated bearings toward and away from the drum, and having their position controlled with relation to the drum by set or regulating screws $i$. By turning these screws the roll can be brought closer to or further from the surface of the drum, as desired. The rubber sheet, as indicated in Fig. 1, passes under this presser bar or roller, between it and the drum, over the top of the latter, and then down on the other side, passing out under a second presser-roll, $h^2$, which, in construction, arrangement, and operation, is in all respects similar to the roll $h$, above described. By these two rolls the rubber sheet is held tightly over the top of the drum. The rotary movement of the drum will carry forward the rubber thus held down on it by the presser or binding-rolls; and the rubber sheet thus moved along will, before it passes out from under the rear presser $h^2$, be divided into strips of any suitable or desired width by cutters arranged above and in contact with the drum.

It is desirable for some purposes, as, for instance, for hose-linings or hose-wrappings, that the side edges of the strips cut from the rubber sheet should be tapered off or beveled. An arrangement of cutters for this purpose is shown in the drawing, consisting of a horizontal cross-bar, $k$, arranged on the frame of the machine a proper distance above the drum, and provided with slanting slots $k'$, formed in its under edge, to receive any suitable number of knives, $l$, placed at proper distances apart in this cutter-holding bar. The knives are placed in the slots, and will thus be caused to occupy a slanting position, cutting the edges of the strips on a bevel. A portion of the cutter-holding bar on an enlarged scale is shown above Fig. 1. A side and an end view of one of the knives, on an enlarged scale, is represented on the right of the drawing below Fig. 2. I prefer to construct these knives as indicated, each consisting of a blade, $l$, fitting in a slotted back, $l^1$, in which is placed a strip of vulcanized rubber, $l^2$, against which the upper edge of the blade bears, the object being to allow the blade to yield slightly in a vertical direction, to adapt itself to any inequalities. The edge of the blade runs in contact, or very nearly in contact with the drum, and the knife is held in place when in the cross-bar $k$ by means of a thin wedge inserted or driven between the back $l^1$ and one of the sides of the slot in which the knife has been inserted. These knives can be removed, replaced, and adjusted, with great ease and facility.

For other purposes, it is desirable to cut the strips of rubber with square edges. Cutters for this purpose are shown at $m$, and on an enlarged scale at the left of the drawing below Fig. 2. I prefer to employ rotary cutter-disks, several being mounted on one shaft and carried by one box. The disks $m$ are set at proper distances apart to cut the sheet into strips of desired width by means of washers $n$ interposed between them. The shaft or rod $o$, that carries the cutters and their separating washers, is mounted in a stem, $p$, which passes up into a box, $r$, and is caused to slide up or down in the said box by means of a regulating or set screw, $p'$, held in the top of the box, and screwing down into the top of the stem, as indicated in the enlarged view. The box is provided with a horizontal screw-threaded stem, $s$, indicated by dotted lines in Fig. 1, passing through a horizontal slot formed in the cross-frame over the drum, in which slot the stem can slide toward either side of the machine, in order to adjust the box in proper position. The box after such adjustment is held in place by a clamping or tightening nut, $t$, screwing onto the stem on the side of the frame opposite to that on which the box is located. The cutters, by means of the regulating-screw $p'$, can be raised from or lowered toward the drum, as occasion demands. Like the knives above described, they should be capable of yielding slightly to adapt themselves to any inequalities or irregularities in the drum or sheet of rubber. The rubber sheet thus divided into strips by either of the instrumentalities above described, or by other suitable cutting mechanism employed in lieu of said instrumentalities, passes out from under the rear presser-bar, and the several strips, into which it has been divided, are wound upon separate shafts. These shafts may be of any suitable number. Three are represented in the drawing, indicated, respectively, by the numbers 1 2 3, each shaft, in construction and arrangement, being the counterpart of the other. They are provided with spools, which can be slipped along on their shafts, so as to be brought to the proper position to receive their strips. Suppose, for instance, the rubber sheet is divided into three strips, then shaft 1 will receive one strip, shaft 2 the second, shaft 3 the third, and the spools on these shafts are set in proper position to receive their strips.

In order to avoid danger of tearing or straining the rubber strips, the shafts do not have a positive and invariable movement of revolution, but each shaft rests between two rollers actuated to revolve in the same direction, and by its frictional contact with these rollers the shaft is caused to revolve in the same direction with them. The shaft thus obtains a rotary movement, but this movement is not invariably the same, but will be retarded, more or less, according to the resistance offered by the rubber strip which is being drawn from the drum and wound upon the shaft. In proportion as the rubber strip is wound on the shaft, the latter can rise in its bearings to accommodate the increase in diameter caused by the winding up of the rubber.

The arrangement just described is shown clearly in the drawing in Fig. 1: Shaft 1 rests between rollers 4 5; shaft 2 rests between rollers 5 6; and shaft 3 between rollers 6 7. These rollers all revolve in the same direction, deriving their movement from the drum through the intermediary of transmitting-gears 8 9 10 11, and gears carried by the rollers themselves, as indicated in Fig. 1. Above the rubber-strip rolls 1 2 3 are arranged rolls 12 13 14, carrying strips of cotton cambric, or other material, which are wound up with the rubber strips in the usual way, to prevent the folds of the uncured rubber from sticking together. After the strips are wound up their shafts are lifted from the machine, the spools are slipped from the shafts, and the strips thus wound on the spools are taken away to be used in subsequent operations in making belting, hose, or other articles.

To facilitate the cutting operation and to prevent the cutters from sticking to the rubber, I arrange above each cutter a nozzle, seen at $k'$, which communicates with a water-pipe, $v$, extending across the machine and supplied with water from a suitable source. Each nozzle is provided with a stop-cock for regulating the discharge of water which should fall from the nozzle in drops, or in a very small stream. The nozzles are so located that the water will drop on the cutters or on the rubber immediately in advance of the cutters. The parts are thus kept wet or moistened, so as to effectually prevent their sticking together.

The water-discharging devices are represented as applied to the slanting knives; but they can as well be applied to the rotary cutters, or to other cutting mechanism, which, as above stated, may, in this machine, be employed in lieu of either of said cutting devices.

Having described my invention, and the manner in which the same is or may be carried into effect, what I claim, and desire to secure by Letters Patent, is—

1. In a machine for cutting uncured rubber sheets into strips, the combination of a rotary carrier-drum, constituting the table or support for the rubber sheet during the cutting operation, with adjustable presser or binding bars or rollers, arranged to hold the rubber sheet down on the drum, substantially as and for the purposes shown and set forth.

2. The combination, with the carrier-drum and adjustable presser or binding bars or rollers, of cutters for dividing the sheet of rubber passing beneath said presser and over said drum enter strips, substantially as shown and set forth.

3. In a machine for cutting up sheets of uncured rubber into strips, the combination, substantially as set forth, with the cutters, of devices substantially such as described, for discharging water on the cutters or on the sheet of rubber immediately in advance of and in line with the cutters during the operation of the machine, for the purposes stated.

4. The rolls or shafts, upon which the rubber strips are wound, each of said shafts resting on and between two rollers revolving in the same direction and deriving its rotary movement from its frictional contact with said rollers, as herein shown and described.

5. The combination of the shafts for receiving the rubber strips and the rollers, which support and impart movement to said shafts with the rotating carrier-drum and cutting mechanism and adjustable presser or binding-rolls, substantially as herein shown and described.

6. The combination of the shafts for receiving the rubber strips and the rollers which support and impart movement to said shafts, of shafts or rolls carrying the cambric or other lining to be wound up with the rubber strips, under the arrangement and for operation as shown and set forth.

7. In combination with the rotating carrier-drum, the horizontal knife-carrying bar arranged above said drum, and the yielding knives held in slanting slots formed in said bar, so as to cut the sheet of rubber passing below into strips with beveled edges, substantially as and for the purposes set forth.

In testimony whereof I have signed my name in the presence of two subscribing witnesses.

THOS. J. MAYALL.

Witnesses:
JOHN BULKLEY,
W. E. CHAFFEE.